(12) United States Patent
Tsuji

(10) Patent No.: US 11,082,584 B2
(45) Date of Patent: Aug. 3, 2021

(54) IMAGE FORMING DEVICE, METHOD, AND PROGRAM PRODUCT WITH CORRECTION IMAGE NOT RECOGNIZED AS POST-PROCESSING IMAGE

(71) Applicant: KONICA MINOLTA, INC., Tokyo (JP)

(72) Inventor: Kosuke Tsuji, Kunitachi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/679,489

(22) Filed: Nov. 11, 2019

(65) Prior Publication Data

US 2020/0213476 A1 Jul. 2, 2020

(30) Foreign Application Priority Data

Dec. 27, 2018 (JP) .............................. JP2018-244047

(51) Int. Cl.
*H04N 1/60* (2006.01)
*G06F 3/12* (2006.01)
(Continued)

(52) U.S. Cl.
CPC ....... *H04N 1/6044* (2013.01); *G03G 15/0194* (2013.01); *G03G 15/5087* (2013.01);
(Continued)

(58) Field of Classification Search
CPC ............. H04N 1/00567; H04N 1/0057; H04N 1/00639; H04N 1/00649; H04N 1/0066; H04N 1/00665; H04N 1/00676; H04N 1/00702; H04N 1/00761; H04N 1/00774; H04N 1/00782; H04N 1/506; H04N 1/6088; H04N 1/6044; H04N 1/6008; G06K 15/16; B41J 11/008; B41J 11/66; B41J 11/663; B41J 11/70; G03G 15/0194; G03G 15/6517; G03G 15/6523; G03G 2215/00443; G03G 2215/00814
See application file for complete search history.

(56) References Cited

U.S. PATENT DOCUMENTS

2001/0004284 A1 6/2001 Fukuda et al.
2005/0105112 A1* 5/2005 Fukuda ................ H04N 1/6033
358/1.9
(Continued)

FOREIGN PATENT DOCUMENTS

JP 2001239731 A 9/2001

*Primary Examiner* — Scott A Rogers
(74) *Attorney, Agent, or Firm* — Buchanan Ingersoll & Rooney PC

(57) ABSTRACT

An image forming device which forms an image for color correction in the margin of a continuous recording medium such as continuous paper as appropriate without causing erroneous detection by a mark sensor at a post-processing stage. In the image forming device, a printing data generator (control section) performs: acquiring a detection criterion to detect a post-processing image for use at the post-processing stage; creating a color correction image to be used for color correction of an original image according to the detection criterion; and arranging the color correction image as an outer area image in an area other than an original image formation area in printing data.

15 Claims, 13 Drawing Sheets

(51) Int. Cl.
*H04N 1/50* (2006.01)
*G06K 15/02* (2006.01)
*G03G 15/01* (2006.01)
*G03G 15/00* (2006.01)

(52) U.S. Cl.
CPC .......... *G06F 3/1211* (2013.01); *G06F 3/1251* (2013.01); *G06K 15/022* (2013.01); *G06K 15/1878* (2013.01); *H04N 1/506* (2013.01); *H04N 1/6008* (2013.01); *G03G 2215/00814* (2013.01); *G03G 2215/0161* (2013.01)

(56) References Cited

U.S. PATENT DOCUMENTS

| | | | |
|---|---|---|---|
| 2007/0266878 A1* | 11/2007 | Underwood | H04N 1/32101 101/484 |
| 2010/0128099 A1* | 5/2010 | Evans | B41J 2/36 347/171 |
| 2010/0245869 A1* | 9/2010 | Kaiser | G01J 3/52 358/1.9 |
| 2011/0064498 A1* | 3/2011 | Takano | G03G 15/238 399/384 |
| 2013/0265609 A1* | 10/2013 | Kawabe | H04N 1/6033 358/3.01 |
| 2018/0227449 A1* | 8/2018 | Yu | G03G 15/6582 |

* cited by examiner

FIG. 9
C  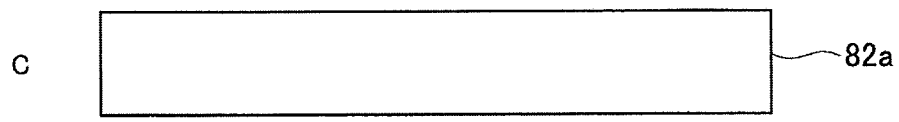
0%  74%
M  
0%  66%
Y  
0%  85%
K  
0%  59%

82%  100%

0%  62%

IMAGE FORMING DEVICE, METHOD, AND PROGRAM PRODUCT WITH CORRECTION IMAGE NOT RECOGNIZED AS POST-PROCESSING IMAGE

CROSS-REFERENCE TO RELATED APPLICATIONS

The entire disclosure of Japanese Patent Application No. 2018-244047, filed on Dec. 27, 2018, is incorporated herein by reference in its entirety.

BACKGROUND

Technological Field

The present invention relates to an image forming device for forming an image on a continuous recording medium, an image forming method, and a non-transitory computer-readable recording medium storing a program.

Description of the Related Art

Conventionally, continuous paper printers which make prints on continuous paper such as roll paper have been used. Continuous paper is often used to repeatedly print a seal type label image such as an address, a serial number or a product description. In continuous paper printers, the front surface (printing side) of continuous paper is almost entirely covered by content information. Therefore, when a patch for color correction is to be printed on continuous paper during printing operation, the content information must be decreased in order to obtain an area for printing of a color correction patch.

However, continuous paper printers are not intended to be used on the assumption that the content information may be changed during printing operation. Therefore, continuous paper printers cannot make a color correction during printing operation after color correction has been once made before start of printing operation, unlike sheet-feed printers which make prints on sheets.

In continuous paper printers, generally an image called "eye mark" is formed separately from a content. An eye mark is a printed mark (positioning reference) which enables a mark sensor to determine a cutting position to cut the continuous paper printed by a continuous paper printer at the post-processing stage. Usually, a black rectangular image is used as an eye mark. Since the line (area which extends in the transportation direction) for arrangement of eye marks is outside the content area on continuous paper, space for a color correction patch is available on the continuous paper.

Patent Literature 1 (JP-A-2001-239731) discloses a technique which prints a calibration pattern in the margin around the image recording area of recording paper which is to be cut with a cutter.

CITATION LIST

Patent Literature

Patent Literature 1: JP-A-2001-239731

SUMMARY

However, if a color correction patch is randomly printed in the space outside the content recording area, a problem arises that a mark sensor which detects an eye mark at a later stage (post-processing stage) may make an erroneous detection. In the technique described in Patent Literature 1, no consideration is given to eye mark detection by a mark sensor at the post-processing stage. Specifically, in creation of the calibration pattern, no consideration is given to the detection criterion for the mark sensor, so the mark sensor may detect the pattern erroneously at the post-processing stage.

The present invention has been made in view of the above circumstances and has an object to form an image for color correction as appropriate in the margin of a continuous recording medium such as continuous paper without causing erroneous detection by the mark sensor at the post-processing stage.

To achieve the above object, according to an aspect of the present invention, an image forming device reflecting one aspect of the present invention comprises: a printing data generator which generates printing data by adding outer area image data to form an outer area image in an outer area extending in a continuous recording medium transportation direction, other than an area for formation of an original image, to original image data; and an image forming section which forms the original image on a continuous recording medium according to the original image data included in the printing data generated by the printing data generator and forms the outer area image on the continuous recording medium according to the outer area image data. The printing data generator arranges a color correction image to be used as the outer area image for color correction, in the outer area in the printing data according to a detection criterion to detect a post-processing image for use at a post-processing stage.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 shows an example of cyan (C), magenta (M), yellow (Y), and black (K) color correction images (second color correction images) according to the first embodiment of the present invention;

DETAILED DESCRIPTION OF EMBODIMENTS

Hereinafter, examples of the forms which embody the present invention (hereinafter called "embodiments") will be described with reference to the accompanying drawings. However, the scope of the invention is not limited to the disclosed embodiments. In this specification and accompanying drawings, constituent elements which have substantially the same functions or structures are designated by the same reference signs and their description is not repeated.

1. First Embodiment

General Configuration of the Image Forming System

First, an example of the configuration of the whole system including an image forming device according to the first embodiment of the present invention will be described.

Figure 1:
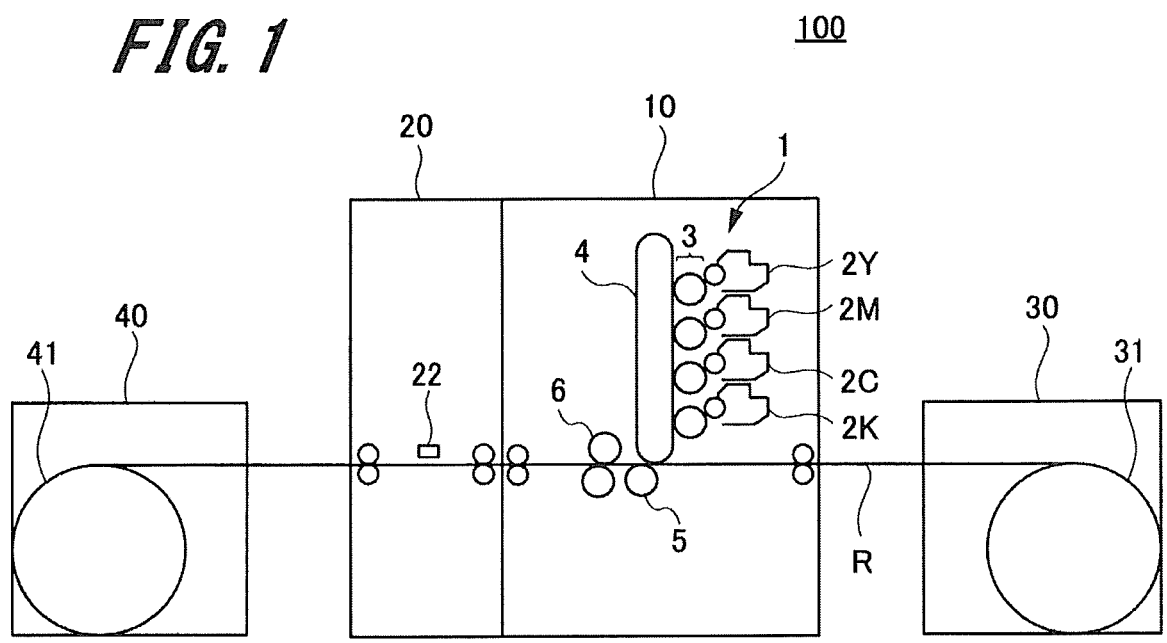
FIG. 1 is a schematic sectional view which shows an outline of the image forming system according to a first embodiment of the present invention.

FIG. 1 is a schematic sectional view which shows an outline of an image forming system 100 according to the first embodiment. The image forming system 100 includes an image forming device 10, an inspection unit 20, a paper feed unit 30 which feeds roll paper R (an example of a continuous recording medium) to the image forming device 10, and a rewinder 40 which rewinds the roll paper R. The image forming device 10 is equivalent to a continuous paper printer as mentioned above.

Figure 2:
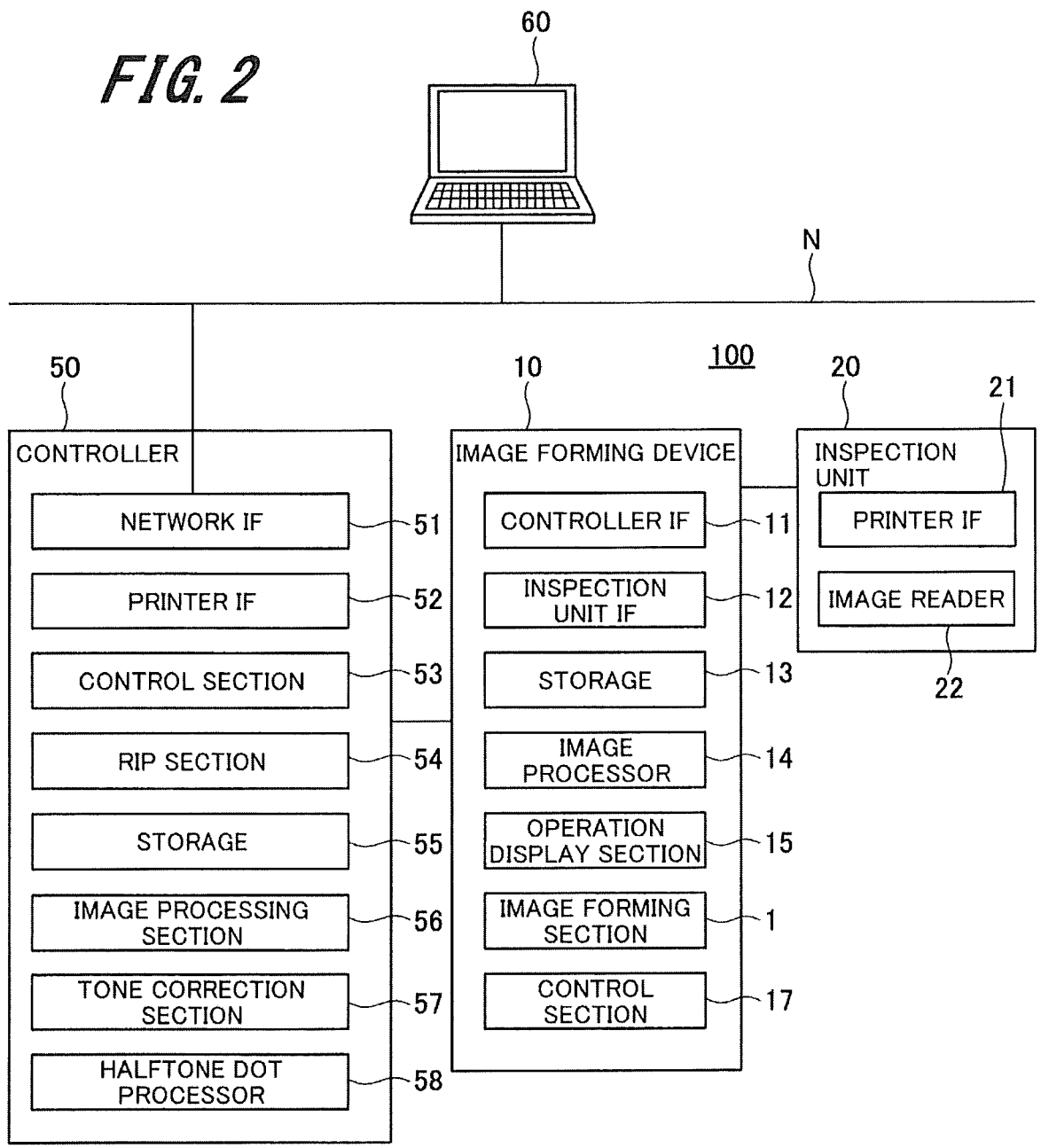
FIG. 2 is a block diagram which shows an example of the configuration of the control system for the various units constituting the image forming system according to the first embodiment of the present invention.

As shown in FIG. 2, the image forming system 100 is connected to a client terminal 60 which generates or selects a printing job, through a printer controller (controller in the FIG. 50 and a network N, so as to perform printing on roll paper R according to the printing job specified by the client terminal 60. The roll paper material is not limited to paper; it may be another material such as resin.

The image forming device 10 has the function to form an image on roll paper R (for example, a label printing function). The image forming device 10 repeatedly forms a content image (for example, label image 71C in FIG. 5) on the surface of the roll paper R supplied from the paper feed unit 30 by a feed roller 31. The roll paper R on which the image has been formed by the image forming device 10 is rewound by the rewinder 40 located downstream of the image forming device 10 in the paper transportation direction.

The image forming device 10 adopts the electrophotographic method for forming an image using static electricity and is a tandem type color image forming device in which, for example, four color toner images of yellow (Y), magenta (M), cyan (C), and black (K) are superimposed.

An image forming section 1 (printer engine) of the image forming device 10 includes four image forming units 2Y, 2M, 2C, and 2K to form yellow, magenta, cyan, and black toner images respectively. Hereinafter, the image forming units 2Y, 2M, 2C, and 2K are collectively called the "image forming unit 2" unless it is necessary to distinguish among the four image forming units.

Each image forming unit 2 includes an electrifying section (not shown), an LED write unit (laser light source) (not shown), a developing section (not shown), and a photoreceptor drum (hereinafter called "photoreceptor") 3. The image forming device 10 includes: an intermediate transfer belt 4 to which the image formed on the photoreceptor 3 of the image forming unit 2 is transferred; a secondary transfer section 5; and a fixing section 6 located downstream of the secondary transfer section 5 in the roll paper R transportation direction. On the downstream side of the fixing section 6, a transportation path extends and joins a delivery hole.

First, in the image forming mode, the image forming device 10 electrifies the surface of the photoreceptor 3 of each image forming unit 2 and exposes the surface of the photoreceptor 3 to light according to the original image to form an electrostatic latent image on the photoreceptor 3. Then, the development section is used to make toners adhere to the electrostatic latent images on the photoreceptors 3 for yellow, magenta, cyan, and black to form four color toner images. Then, the yellow, magenta, cyan, and black toner images formed on the photoreceptors 3 are primarily transferred sequentially to corresponding positions on the surface of the intermediate transfer belt 4 which is rotating.

Next, the secondary transfer section 5 (secondary transfer roller) secondarily transfers the four color toner images primarily transferred to the intermediate transfer belt 4, to the roll paper R supplied from the paper feed unit 30. As the four color toner images are secondarily transferred from the intermediate transfer belt 4 to the roll paper R, a color image is formed. The image forming device 10 transports the roll paper R bearing the color toner image to the fixing section 6.

The image forming units 2 and the intermediate transfer belt 4 each include a cleaning section (a cleaning blade, a cleaning brush, a cleaning roller or the like) (not shown).

The cleaning section of each image forming unit 2 removes the residual toner on the surface of the photoreceptor 3 after the primary transfer to the intermediate transfer belt 4. The cleaning section of the intermediate transfer belt 4 removes the residual toner on the surface of the intermediate transfer belt 4 after the secondary transfer.

The fixing section 6 is a device which performs the process to fix the color toner image on the roll paper R transported from the image forming device 10. The fixing section 6 fixes the transferred toner image on the roll paper R by pressurizing and heating the transported roll paper R. For example, the fixing section 6 includes an upper fixing roller and a lower fixing roller as fixing members. The upper fixing roller and lower fixing roller are held in pressure contact with each other so that the part of pressure contact between the upper fixing roller and lower fixing roller forms a fixing nip part. A heater is built in the upper fixing roller and the roller part on the outer circumference of the upper fixing roller is heated by radiation heat from the heater.

The roll paper R after the fixing process is transported to the inspection unit 20 with an image reader 22 and passed through the inspection unit 20 and delivered to the rewinder 40. The rewinder 40 rewinds the delivered roll paper R by a rewind roller 41.

In the image forming system 100 thus configured, at the post-processing stage after the printing process, die cutting is performed in order to cut a plurality of label images printed on the roll paper R. In the post-processing machine which performs die cutting, the printed matter as the roll paper R (output roll) on which label images have been printed by the image forming device 10 is set in place and the label images are cut. The continuous paper bears printing marks called "eye marks" in addition to the label images. The eye marks serve as a position reference which the post-processing machine uses for positioning and they are usually black rectangles.

The mark sensor of the post-processing machine receives an electric signal which corresponds to the brightness difference between the base color of the roll paper R and the eye mark. If the electrical signal level is a threshold (detection criterion) or higher, the mark sensor determines that an eye mark exists. The post-processing machine detects an eye mark on the roll paper R and presses a cutting roller with a blade against the roll paper R at a prescribed position in reference to the eye mark concerned to cut a label image.

Configuration of the Control System of the Image Forming System

Next, the configuration of the control system of the image forming system 100 will be described referring to FIG. 2.

FIG. 2 is a block diagram which shows an example of the configuration of the control system for the various units constituting the image forming system 100. In this embodiment, the client terminal 60 and the printer controller (hereinafter simply called the "controller") 50 are communicably connected through the network N. Also, the controller 50 and the image forming device 10 are connected communicably through serial communications, etc. and the image forming device 10 and the inspection unit 20 are connected communicably through serial communications, etc.

(Client Terminal)

The client terminal 60 is, for example, a personal computer and includes an arithmetic processor, a storage, an operation section, and a display section, although these components are not shown. The client terminal 60 has a document creating function and a printing job generating function. The document creating function is implemented, for example, by a document or image creating application. The document creating function creates an original for printing in the form of an application file according to an instruction entered by the user through the operation section. Also, the document creating function generates an original image data file for the original image for printing when the user makes an operation to create an original.

The printing job generating function is implemented, for example, by an application for direct printing or a printer driver. The printing job generating function writes, in a job ticket, printing setting information for the original image, and an instruction entered by the user through the operation section concerning the finish of printed matter. The job ticket may be considered as printing job setting information.

The printing job generating function converts the image data in the form of an application file as generated by the document creating function into printing data described in a language which can be read by the controller 50. One example of the language readable by the controller 50 is PCL (Printer Command Language) or PDL (Page Description Language) such as PostScript. The printing job generating function generates a printing job which includes a job ticket and image data described in PDL (hereinafter called "PDL data"). The PDL data includes information on the pixel value and coordinates of each of the pixels constituting the image data.

(Controller)

The controller 50 includes a network IF 51 (an example of a transmitter or receiver), a printer IF 52 (an example of a printing job acquiring section), a control section 53, and a RIP (Raster Image Processor) section 54. The controller 50 further includes a storage 55, an image processor 56, a tone correction section 57, and a halftone dot processor 58.

The network IF 51 is connected to the network N through a communication cable and controls transmission and reception of data and control signals with the client terminal 60 connected to it through the network N.

The printer IF 52 is connected to the image forming device 10 through the communication cable and controls transmission and reception of data and control signals with the image forming device 10.

The control section 53 is an arithmetic processor such as a CPU (Central Processing Unit) which controls the various sections of the controller 50. The control section 53 analyzes the job ticket included in the printing job sent from the client terminal 60 and sends the request content obtained by the analysis to the image forming device 10 through the network IF 51. In addition, the control section 53 acquires the PDL data from the printing job sent from the client terminal 60 and sends the acquired PDL data to the RIP section 54. The control section 53 is an example of the printing data generator which generates printing data including the original image and color correction images which will be described later.

The RIP section 54 translates (rasterizes) the PDL data received sequentially from the control section 53 in the order of arrival and generates bit-map image data. In this process, the RIP section 54 performs color conversion to adjust the printed matter to the desired color. For example, an ICC (International Color Consortium) profile is used for color conversion. The RIP section 54 sends the generated image data to the image processor 56 or tone correction section 57.

The storage 55 includes, for example, a nonvolatile recording medium such as a ROM (Read Only Memory) or HDD (Hard Disk Drive) and a RAM (Random Access Memory). The nonvolatile recording medium stores the program (software) for the control section 53 to perform arithmetic processing, various types of image data, various tables and so on. The RAM is used as a working area for the control section 53 to execute the program. For example, the storage 55 stores an ICC profile, and a tone curve characteristic file or correction table (LUT: LookUp Table). Also, the storage 55 stores the criterion to detect a post-processing image (for example, eye mark) which is used at the post-processing stage (for example, the post-processing machine) and the setting information about the arrangement of post-processing images and color correction images.

The image processor 56 performs various image processing tasks for the image data received from the RIP section 54. The image processing tasks which the image processor 56 performs are a tone correction process using a tone curve, addition of a white base color to the image data, limitation on the amount of toner and so on. The image processor 56 sends the image data subjected to image processing to the tone correction section 57 as necessary.

The tone correction section 57 makes a correction to adjust the image brightness and contrast for the image data received from the RIP section 54 or the image processor 56 and sends the corrected image data to the halftone dot processor 58.

The halftone dot processor 58 converts the image data received from the tone correction section 57 into halftone dots and sends the halftone dot image data obtained by the conversion to the image forming device 10 through the printer IF 52.

(Image Forming Device)

The image forming device 10 performs printing according to an instruction from the controller 50. The image forming device 10 includes a controller IF 11, an inspection unit IF 12, a storage 13, an image processor 14, an operation display section 15, the image forming section 1, and a control section 17.

The controller IF 11 is connected to the network N and controls transmission and reception of data and control signals with the client terminal 60 or controller 50 connected to it through the network N.

The inspection unit IF 12 is connected to the inspection unit 20 through the communication cable and controls transmission and reception of data and control signals with the inspection unit 20.

The storage 13 includes, for example, a nonvolatile recording medium such as a ROM or HDD, and a RAM. The nonvolatile recording medium stores the program (software) for the control section 17 to perform arithmetic processing, various types of image data, various tables and so on. The RAM is used as a working area for the control section 17 to execute the program.

The image processor 14 performs prescribed image processing (correction) on the image data received by the controller IF 11, in order to stabilize the image formation.

The operation display section 15 is, for example, an operation panel installed over the housing of the image forming device 10 and generates an operation signal according to the operational content entered by the user and sends the generated operation signal to the control section 17.

The image forming section 1 forms an image on the roll paper R according to the image data in the printing job sent from the controller 50 under the control by the control section 17. When the image forming section 1 receives a request to start printing from the client terminal in which a job management application has been installed, it reads the previously stored printing job from the storage 13 and performs printing.

The control section 17 is, for example, a CPU or the like and controls the various sections of the image forming device 10. The control section 17 is an example of the color correction section which makes color correction for the image forming section 1 according to the image data read from the roll paper R as received from the inspection unit 20. The control section 17 acquires the RGB values of a color correction image using the image reader 22 of the inspection unit 20 connected to the image forming device 10 and makes a color correction using the RGB values.

The control section 17 may adopt a color correction method which corrects the relative change in RGB values. Specifically, the control section 17 makes a tone correction based on device-dependent relative calculation. Also, the RGB values in the device-dependent color system may be converted into L*a*b* values in the device-independent color system or the like using the color profile (scanner profile) of the image reader 22. By converting the RGB values in the image reader 22 into L*a*b* values or XYZ values using the scanner profile, tone correction can be made in a device-independent manner by absolute calculation.

(Inspection Unit)

The inspection unit 20 includes a printer IF 21 and the image reader 22. The printer IF 21 is connected to the image forming device 10 through the communication cable and controls transmission and reception of data and control signals with the image forming device 10.

The image reader 22 is an example of an image input device such as an image sensor. For example, the image reader 22 scans the roll paper R and irradiates the surface of the roll paper R with light to take an electric signal depending on the reflected light from the roll paper R, as read image data. The operation that the image reader 22 takes the image from the printed surface of the roll paper R in this way is called "read". The image reader 22 reads the roll paper R transported through the transportation path, from above the transportation path. The image reader 22 sends the image data read from the roll paper R to the image forming device 10.

In the example shown in FIG. 2, the controller 50 and the image forming device 10 are separate from each other. However, the present invention is not limited thereto. The blocks which constitute the controller 50 may be incorporated in the image forming device 10.

Functions of the Control Section

Next, an example of the functions of the control section 53 of the controller 50 will be explained referring to FIGS. 3 and 4.

Figure 3:
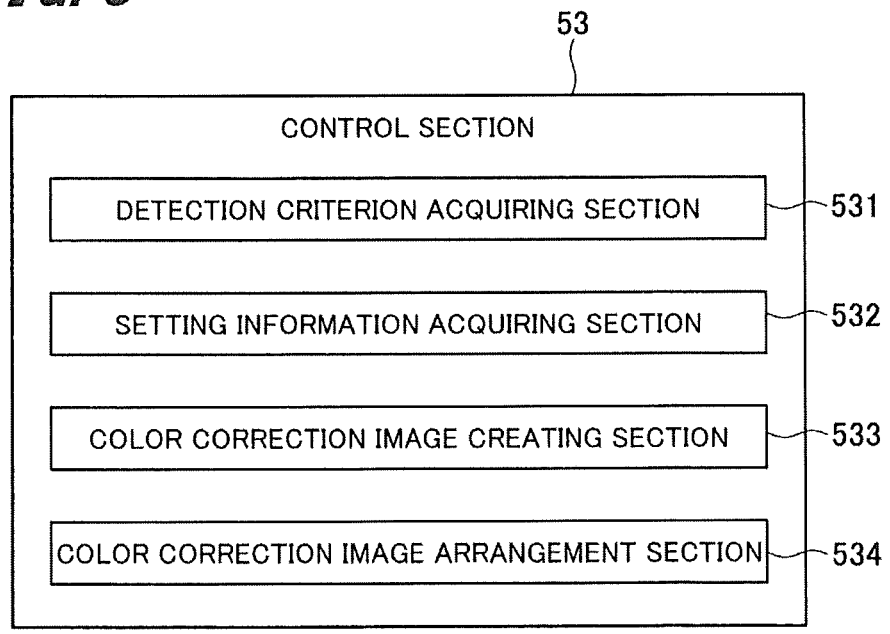
FIG. 3 is a block diagram which shows an example of the functions of the control section of the controller according to the first embodiment of the present invention.

FIG. 3 is a block diagram which shows an example of the functions of the control section 53 of the controller 50. The control section 53 includes a detection criterion acquiring section 531, a setting information acquiring section 532, a color correction image creating section 533, and a color correction image arrangement section 534.

The detection criterion acquiring section 531 reads and acquires a detection criterion to detect a post-processing image (for example, eye mark) which is used at the post-processing stage, from the storage 55. Although in this embodiment an eye mark is explained as an example of the post-processing image, the post-processing image is not limited to an eye mark.

The setting information acquiring section 532 reads and acquires the setting information about the arrangement of post-processing images and color correction images (for example, first color correction images 81*a* to 81*c* and second color correction images 82*a* and 82*b* shown in FIG. 6 which will be described later), from the storage 55.

The color correction image creating section 533 creates a color correction image simulating a post-processing image (first color correction image) according to the detection criterion acquired by the detection criterion acquiring section 531. The color correction image creating section 533 also creates a color correction image (second color correction image) which is not recognized as a post-processing image, according to the detection criterion. In this process, the color correction image creating section 533 calculates the color value (tone) of the basic color for the image forming device 10 (image forming section 1) according to the detection criterion.

The color correction image arrangement section 534 arranges color correction images as outer area images in outer areas 72 and 73 extending in the roll paper R transportation direction (see FIG. 6) other than an original image formation area 71 in which an original image is formed. Specifically, the color correction image arrangement section 534 arranges the first color correction images at post-processing image places (for example, eye mark places 75*a* to 75*c* in FIG. 5) in the post-processing image printable areas (for example, eye mark printable areas 74-1 to 74-3 in FIG. 5) in printing data. Also, the color correction image arrangement section 534 arranges the second color correction images at places other than the post-processing image places in the post-processing image printable areas in the printing data. Thus, the color correction image arrangement section 534 arranges color correction images depending on the color value (tone) of the basic color for the image forming device 10, in the outer areas.

Sequence of the Printing Data Generating Process

Next, the sequence of the printing data generating process by the control section 53 of the controller 50 according to the first embodiment will be explained.

Figure 4:
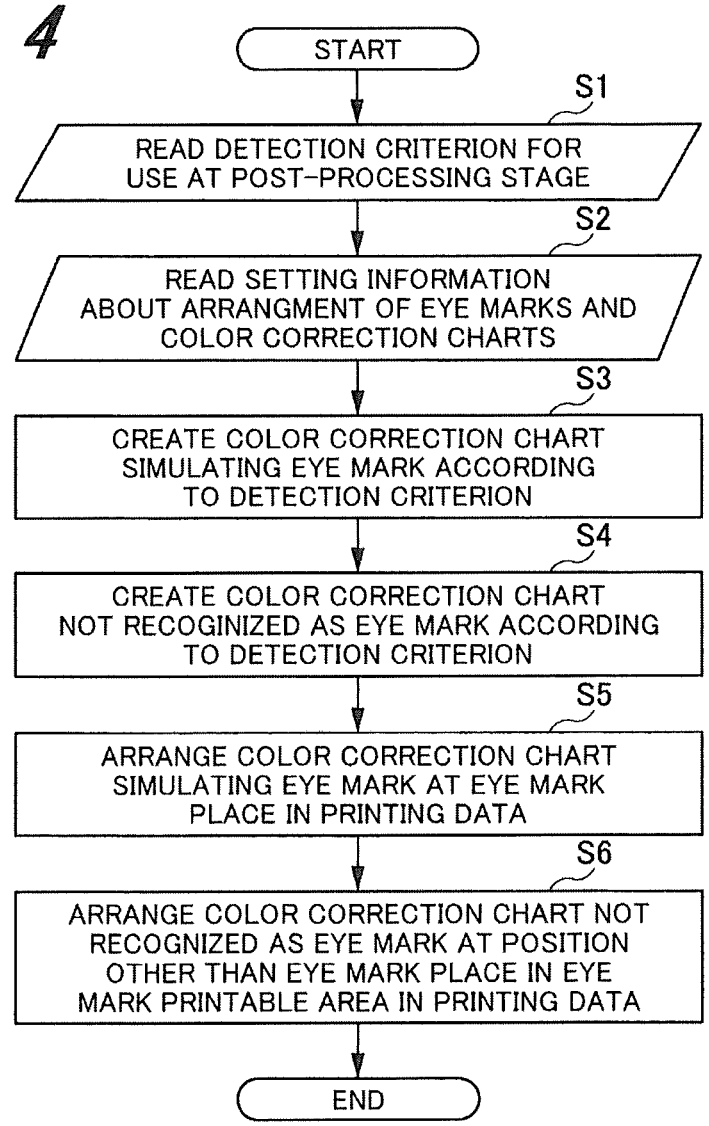
FIG. 4 is a flowchart which shows an example of the sequence of the printing data generating process by the control section of the controller according to the first embodiment of the present invention.

FIG. 4 is a flowchart which shows an example of the sequence of the printing data generating process by the control section 53 of the controller 50. As an example, an eye mark as a post-processing image (first color correction image) and a color correction chart as a color correction image (second color correction image) are explained below.

It is assumed here that the storage 55 of the controller 50 stores the information on the detection criterion (color value threshold) to detect a post-processing image (eye mark) for use at the post-processing stage. For example, in this embodiment, the color value threshold is the tone value of the basic color (each of C, M, Y, and K colors) for the image forming section 1 (device) which corresponds to the brightness difference from the base color of the roll paper R. Although a tone value is expressed as a percentage (%) in the explanation given below, it is not limited to percentage. For example, a tone value may be expressed as 8 bit (0-256) or 16 bit (0-65536).

As a printing job is sent from the client terminal 60 or the like through the network N to the controller 50, the control section 53 of the controller 50 analyzes the printing job and performs the process to generate printing data from the original image data included in the printing job. In this process, the detection criterion acquiring section 531 reads the detection criterion to detect an eye mark as a post-processing image for use at the post-processing stage, from the storage 55 (51).

Figure 6:
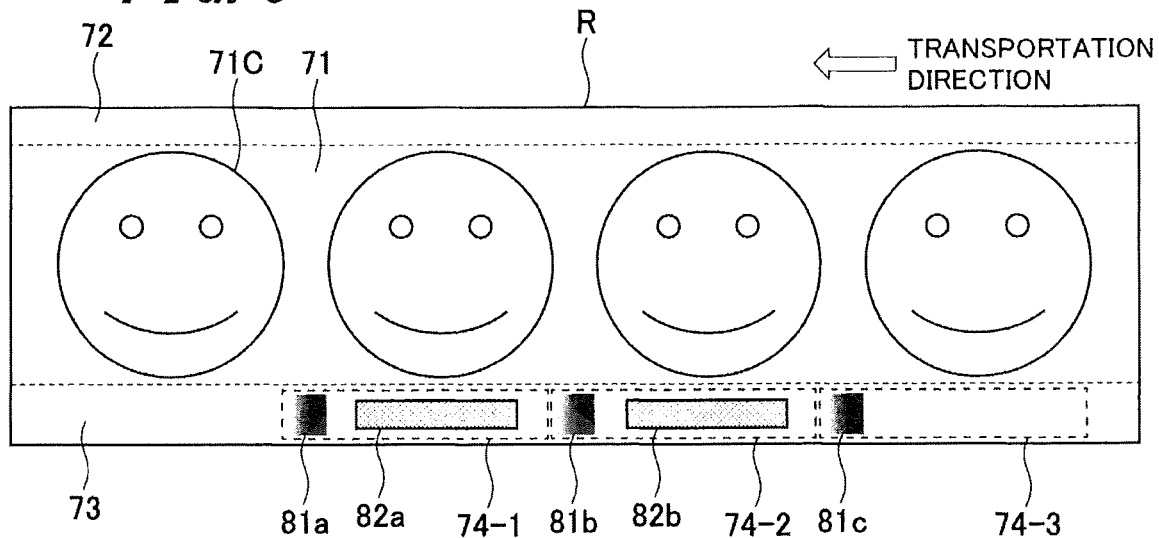
FIG. 6 is a print image which shows an example of arrangement of eye marks and color correction images according to the first embodiment of the present invention.

Next, the setting information acquiring section 532 reads the setting information about the arrangement of post-processing images and color correction images (first color correction images 81*a* to 81*c* and second color correction images 82*a* and 82*b*, etc. in FIG. 6) from the storage 55 (S2).

Then, the color correction image creating section 533 creates a color correction chart as a color correction image simulating an eye mark (an example of a first color correction image), according to the detection criterion read by the detection criterion acquiring section 531 (S3). The color correction image creating section 533 also creates a color correction chart which is not recognized as an eye mark (an example of a second color correction image), according to the detection criterion (S4).

Next, the color correction image arrangement section 534 arranges the first color correction images 81*a* to 81*c* simulating an eye mark at the eye mark places (eye mark places 75*a* to 75*c* in FIG. 5) in the eye mark printable areas (eye mark printable areas 74-1 to 74-3 in FIG. 5) in the printing data (S5). The color correction image arrangement section 534 also arranges the color correction images 82*a* and 82*b* (color correction charts) not recognized as eye marks, at places other than the eye mark places in the eye mark printable areas in the printing data (S6).

As explained above, the control section 53 arranges the color correction images to be used as outer area images for color correction, in the outer areas 72 and 73 in the printing data, according to the detection criterion to detect the post-processing images for use at the post-processing stage. In other words, the control section 53 creates not only the content image (label image 71C) but also color correction charts simulating an eye mark and color correction charts not recognized as eye marks as appropriate and arranges them on the printing data. Then, the control section 53 sends the resultant printing data from the controller 50 to the image forming device 10 through the printer IF 52.

Conventional Print Image

Figure 5:
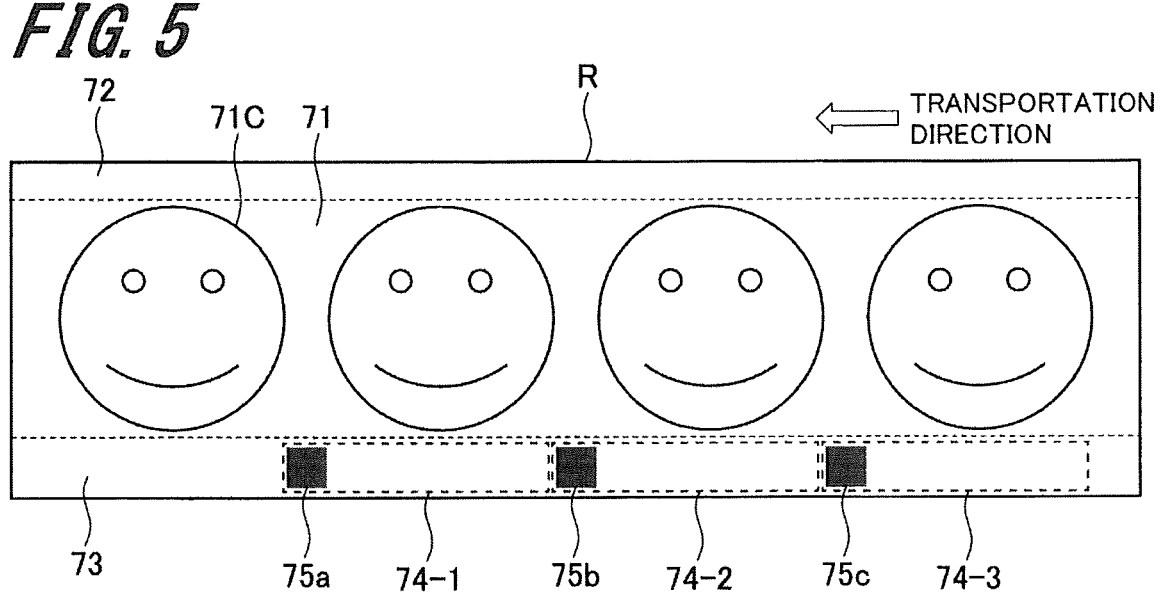
FIG. 5 is a print image which shows an example of the conventional arrangement of eye marks.

Next, a conventional print image which includes eye marks will be explained. FIG. 5 shows a print image which shows an example of the conventional arrangement of eye marks.

The roll paper R is divided into the original image formation area 71 in which an original image (for example, consecutive label images 71C) is formed, and outer areas 72 and 73 extending in the roll paper R transportation direction (moving direction), other than the original image formation area 71. The original image formation area 71 is a center area in the direction perpendicular to the roll paper R transportation direction.

The outer areas 72 and 73 lie near the edges of the roll paper R in the direction perpendicular to the roll paper R transportation direction, on both sides of the original image formation area 71. Outer area images are formed in the outer areas 72 and 73 along the transportation direction. The outer area images are post-processing images (first color correction images) such as eye marks and/or color correction images (second color correction images). Although two outer areas 72 and 73 are specified in the example shown in FIG. 5, instead only one outer area may be specified.

The eye mark printable areas 74-1 to 74-3 are areas in the outer area 73 in which eye marks can be printed. Eye marks are printed in the eye mark printable areas. In other words, the spaces inside the outer areas 72 and 73 may be all considered as eye mark printable areas. The eye mark places 75a to 75c indicate the positions at which eye marks are placed in the eye mark printable areas 74-1 to 74-3. As shown in FIG. 5, generally a black rectangular image is used as an eye mark. As the post-processing machine automatically recognizes (detects) an eye mark, typically, cutting of the roll paper R is performed.

Print Image in the Present Invention

Next, a print image according to the first embodiment of the present invention will be explained.

FIG. 6 shows a print image which shows an example of arrangement of eye marks and color correction images according to the first embodiment.

FIG. 6 shows that the first color correction images 81a to 81c simulating an eye mark are printed at the eye mark places 75a to 75c (see FIG. 5) in the eye mark printable areas 74-1 to 74-3 of the roll paper R, respectively. The first color correction images 81a to 81c are recognized as eye marks at the post-processing stage since they satisfy the detection criterion.

As shown in FIG. 6, the second color correction images 82a and 82b which are not recognized as eye marks are printed at places (blank spaces) other than the eye mark places 75a to 75c in the eye mark printable areas 74-1 to 74-3. The second color correction images 82a and 82b are not recognized as eye marks at the post-processing stage since they do not satisfy the detection criterion.

FIG. 6 shows that the first color correction images simulating an eye mark and the second color correction images not recognized as eye marks are formed in the eye mark printable areas. In the conventional print image, only black rectangles are printed and nothing is printed in the blank spaces of the eye mark printable areas (see FIG. 5). Therefore, by forming color correction images whose density is insufficient for recognition as eye marks by the post-processing machine, in the blank spaces, color correction can be made while erroneous detection by the post-processing machine is prevented.

Figure 7:
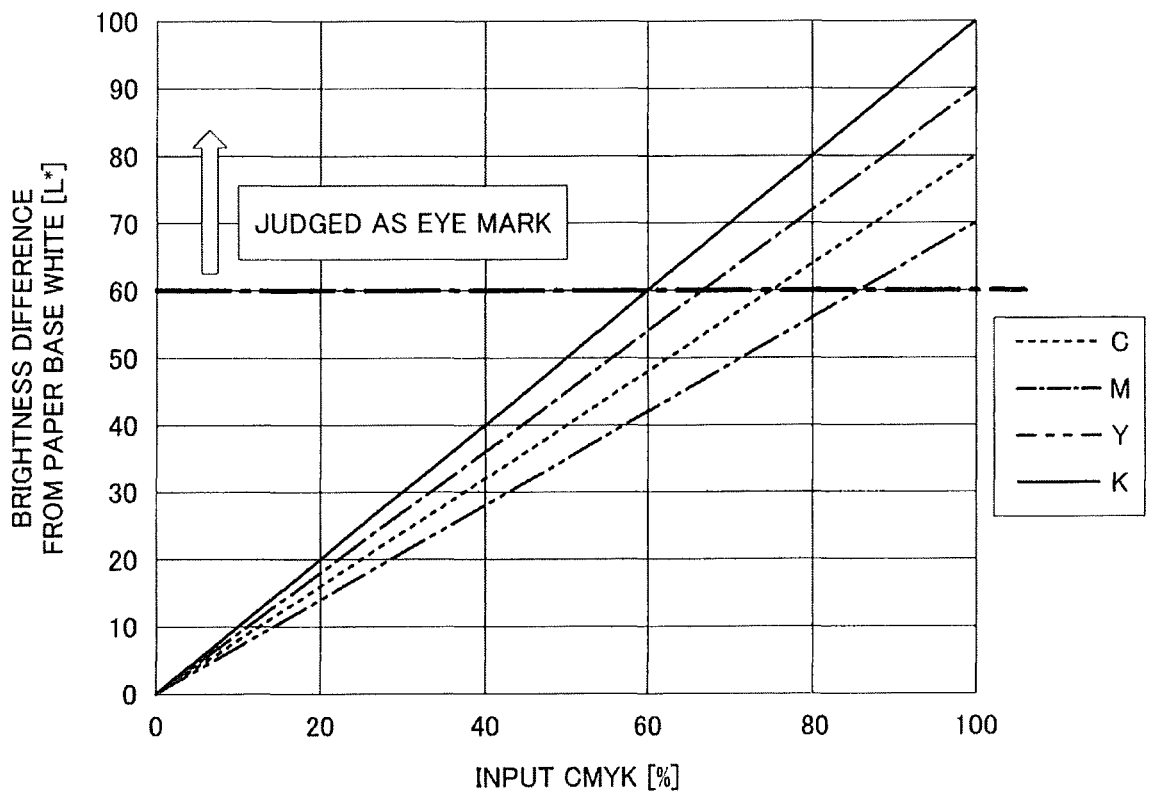
FIG. 7 is a graph which shows an example of the relation between input CMYK value and brightness difference from the base color according to the first embodiment of the present invention.
Figure 17:
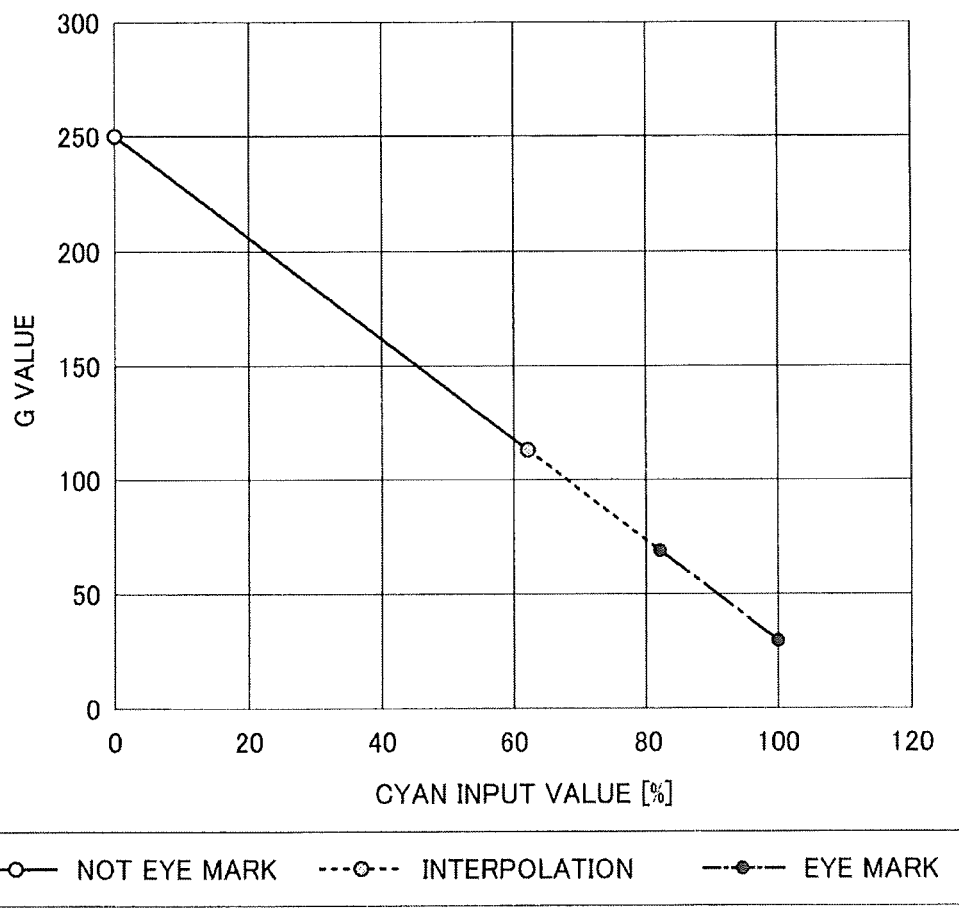
FIG. 17 is a graph which shows the relation between cyan input value and brightness difference from the base color according to the third embodiment of the present invention.

Example of the Relation Between Input CMYK Values and Brightness Difference from the Base Color FIG. 7 is a graph which shows an example of the relation between input CMYK value and brightness difference from the base color of the roll paper R according to the first embodiment. The horizontal axis represents input CMYK value [%] and the vertical axis represents brightness difference [L*] between input CMYK value and the base color. The input CMYK value [%] indicates the density tone value of each of C, M, Y, and K colors by percentage, for example, in which tone value 255 is expressed as 100[%] and tone value 0 is expressed as 0[%]. [L*] indicates a dimension which means the brightness in the device-independent L*a*b* color space. Although the brightness difference is expressed as L* in FIG. 7, it may be replaced by G value highly correlated to L* as shown in FIG. 17. Furthermore, even when density is used instead of brightness, the same effect can be achieved.

FIG. 7 schematically shows the case that when the brightness difference between input CMYK value and the base color is 60 [L*] or more, an image is judged as an eye mark. In other words, if the brightness difference is 59 [L*] or less, the post-processing machine does not judge the image as an eye mark. The C, M, Y, and K values which correspond to brightness difference 60 [L*] as the detection criterion (threshold) are as follows.
Cyan: 75% tone
Magenta: 67% tone
Yellow: 86% tone
Black: 60% tone Example of First Color Correction Images Next, the method for creating an eye mark which also serves as a color correction image (first color correction image) will be explained.

Figure 8:
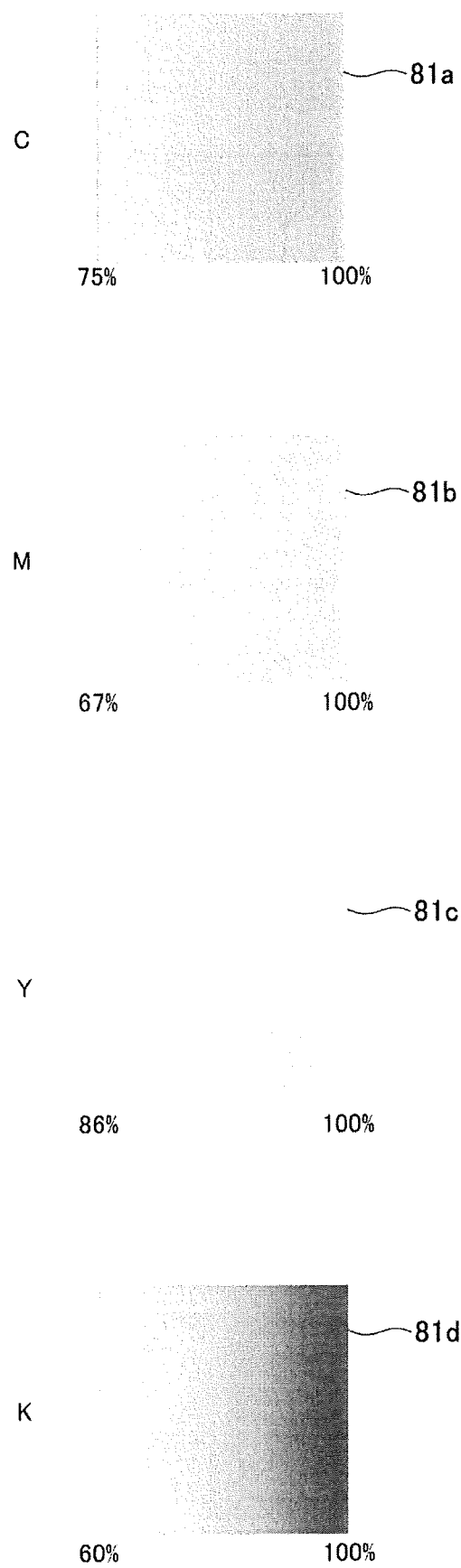
FIG. 8 shows an example of cyan (C), magenta (M), yellow (Y), and black (K) eye marks (first color correction images) according to the first embodiment of the present invention.

FIG. 8 shows an example of cyan, magenta, yellow, and black eye marks (first color correction images) according to the first embodiment. Here, the brightness difference (tone) which is sufficient for recognition as an eye mark is used to arrange a color correction image at an eye mark place in an eye mark printable area.

For cyan, 75%-100% tone represents an eye mark (first color correction image 81a).

For magenta, 67%-100% tone represents an eye mark (first color correction image 81b).

For yellow, 86%-100% tone represents an eye mark (first color correction image 81c).

For black, 60%-100% tone represents an eye mark (first color correction image 81d).

The first color correction images 81a to 81d may be alternately arranged at eye mark places or an important color for the content image or printed matter may be selected to arrange color correction images of the selected color in a row. Alternatively, the basic colors used for the content image may be used to arrange first color correction images simulating an eye mark. For example, if cyan is not used in the content image, first color correction images are arranged for the other three colors, namely magenta, yellow, and black. Furthermore, the dominant color in the content image may be used to arrange first color correction images.

Example of Second Color Correction Images

Next, the method for creating a color correction image (second color correction image) to be placed in an eye mark printable area without an eye mark (blank space) will be explained.

FIG. 9 shows an example of color correction images of cyan, magenta, yellow, and black (second color correction images) according to the first embodiment. Here, the brightness difference (tone) which is insufficient for recognition as an eye mark is used to arrange a color correction image in the blank space of an eye mark printable area.

For cyan, 0%-74% tone represents a color correction image (second color correction image 82a).

For magenta, 0%-66% tone represents a color correction image (second color correction image 82b).

For yellow, 0%-85% tone represents a color correction image (second color correction image 82c).

For black, 0%-59% tone represents a color correction image (second color correction image 82d).

Also for second color correction images, it is desirable to create color correction images according to the content image, more specifically according to the important color for the content image or printed matter or the basic color used in the content image or the dominant color in the content image and arrange the color correction images in the blank spaces of eye mark printable areas.

Although color correction images are created as gradation charts in the example shown in FIGS. 7 and 8, they are not limited to gradation charts like the example. Depending on the resolution of the inline image reader 22 (see FIG. 1), the image reader 22 can acquire RGB values. For example, if the resolution of the image reader 22 is 400 dpi, the RGB values of color correction images can be acquired per 0.0635 mm. Therefore, a color correction image may be created as a step chart as shown in FIG. 10.

Figure 10:
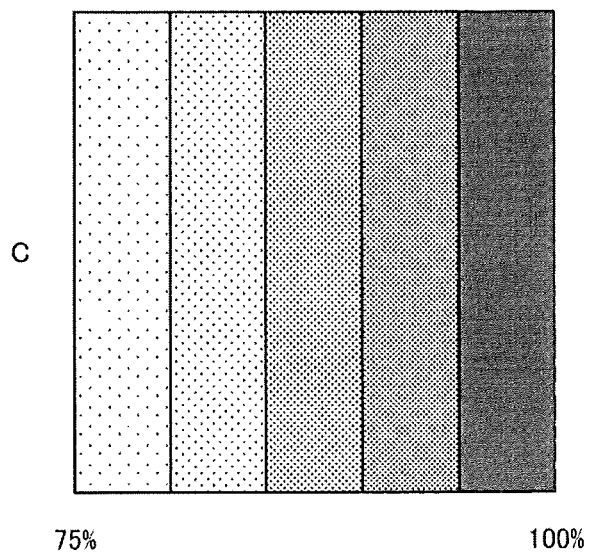
FIG. 10 shows another example of an eye mark according to the first embodiment of the present invention.

FIG. 10 shows another example of an eye mark according to the first embodiment.

The example shown in FIG. 10 is the first color correction image 81a of cyan shown in FIG. 8 which is expressed as a step chart. In FIG. 10, the 75%-100% tone values of cyan are expressed in five steps in the transportation direction.

The image forming system 100 according to the first embodiment as mentioned above includes: a printing data generator (control section 53) which generates printing data by adding outer area image data for forming an outer area image (for example, a color correction image) in an outer area extending in the continuous recording medium transportation direction, other than the original image formation area, to original image data and; and the image forming section 1 which forms the original image on the continuous recording medium according to the original image data included in the printing data generated by the printing data generator (control section 53) and forms the outer area image on the continuous recording medium according to the outer area image data.

According to the first embodiment, a color correction image can be formed as appropriate in an outer area (margin) of the continuous recording medium according to the detection criterion (mark sensor detection criterion) to detect a post-processing image for use at the post-processing stage. Therefore, a color correction image (eye mark) which is detected by the mark sensor at the post-processing stage or a color correction image which is not detected by the mark sensor at the post-processing stage can be formed in an outer area of the continuous recording medium. Therefore, erroneous detection by the mark sensor does not occur at the post-processing stage.

For example, when a first color correction image which satisfies the detection criterion (threshold or more in brightness difference) is arranged according to the eye mark size and read by the image reader 22, the color value (for example, RGB value) for color correction can be acquired even from the limited area to make a color correction. In addition, since a second color correction image which does not satisfy the detection criterion is not recognized as an eye mark, it can be arranged freely in the blank space of an eye mark printable area.

2. Second Embodiment

One color correction image which is printed on the roll paper R according to the first embodiment as mentioned above is not always a monochromatic image. One color correction image may have two or more colors.

Figure 11:
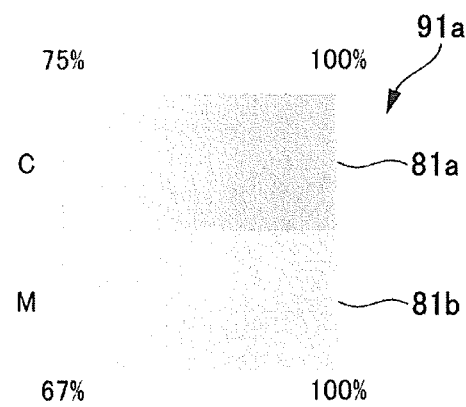
FIG. 11 shows an example of an eye mark (first color correction image) according to a second embodiment of the present invention.

FIG. 11 shows an example of an eye mark (first color correction image) according to the second embodiment. As shown in FIG. 11, in a first color correction image 91a simulating an eye mark, a cyan first color correction image 81a and a magenta first color correction image 81b (see FIG. 8) are arranged vertically (in the direction perpendicular to the transportation direction). In this case, the boundary between the colors is horizontal. The first color correction image 81a and first color correction image 81b which are vertically arranged have different tone value ranges.

In addition, color correction images may be printed in a different manner from the above. For example, color correction images of different colors may be arranged horizontally (in the transportation direction) instead of vertically. Or color correction images of two or more different colors may be arranged in a checkerboard pattern. In addition, a second color correction image of two or more colors may be arranged in the blank space of an eye mark printable area of the roll paper R as mentioned above.

Figure 12:
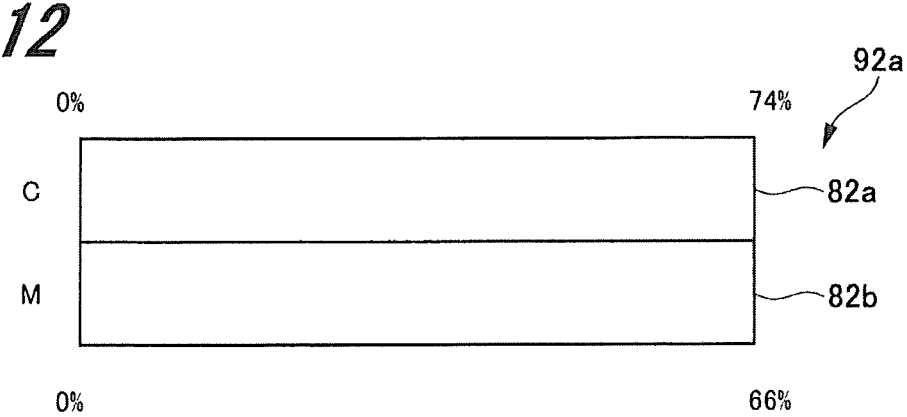
FIG. 12 shows an example of cyan (C), magenta (M), yellow (Y), and black (K) color correction images (second color correction images) according to the second embodiment of the present invention.

FIG. 12 shows an example of cyan, magenta, yellow, and black color correction images (second color correction images) according to the second embodiment. As shown in FIG. 12, in a second color correction image 92a which is not recognized as an eye mark, a cyan second color correction image 82a and a magenta second color correction image 82b (see FIG. 9) are arranged vertically (in the direction perpendicular to the transportation direction).

Figure 13:
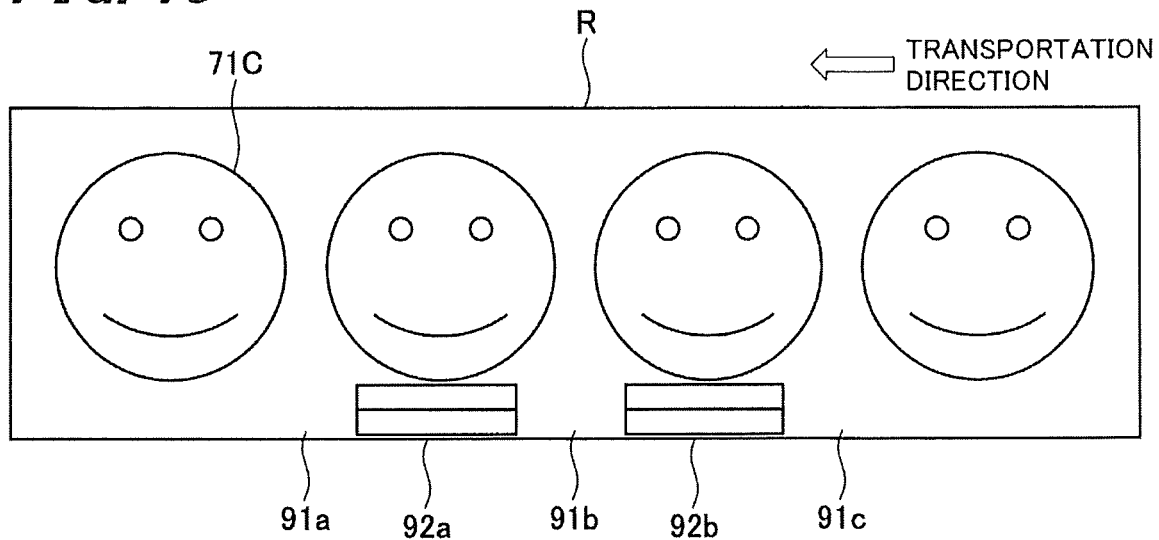
FIG. 13 is a print image which shows an example of arrangement of eye marks and color correction images according to the second embodiment of the present invention.

FIG. 13 is a print image which shows an example of arrangement of eye marks and color correction images according to the second embodiment. As shown in FIG. 13, first color correction images 91a to 91c as color correction images simulating an eye mark and second color correction images 92a and 92b as color correction images not recognized as eye marks are printed. The first color correction image 91b includes, for example, a yellow first color correction image 81c and a black first color correction image 81d. The first color correction image 91c may have the same color combination as the first color correction image 91a or a different color combination. The second color correction image 92b includes, for example, a yellow second color correction image 82c and a black second color correction image 82d.

According to the second embodiment, since color correction images are composed as mentioned above, color correction images with two or more colors can be printed in the limited space of outer areas of the continuous recording medium.

3. Third Embodiment

The third embodiment concerns a printing data generating method and a color correction method in the case that the detection criterion has a range in which it is impossible to judge whether an image is an image for the post-processing stage or not. The phenomenon that the detection criterion has a range in which it is impossible to judge whether an image is an image for the post-processing stage or not occurs, for example, depending on the performance of the post-processing machine.

Figure 14:
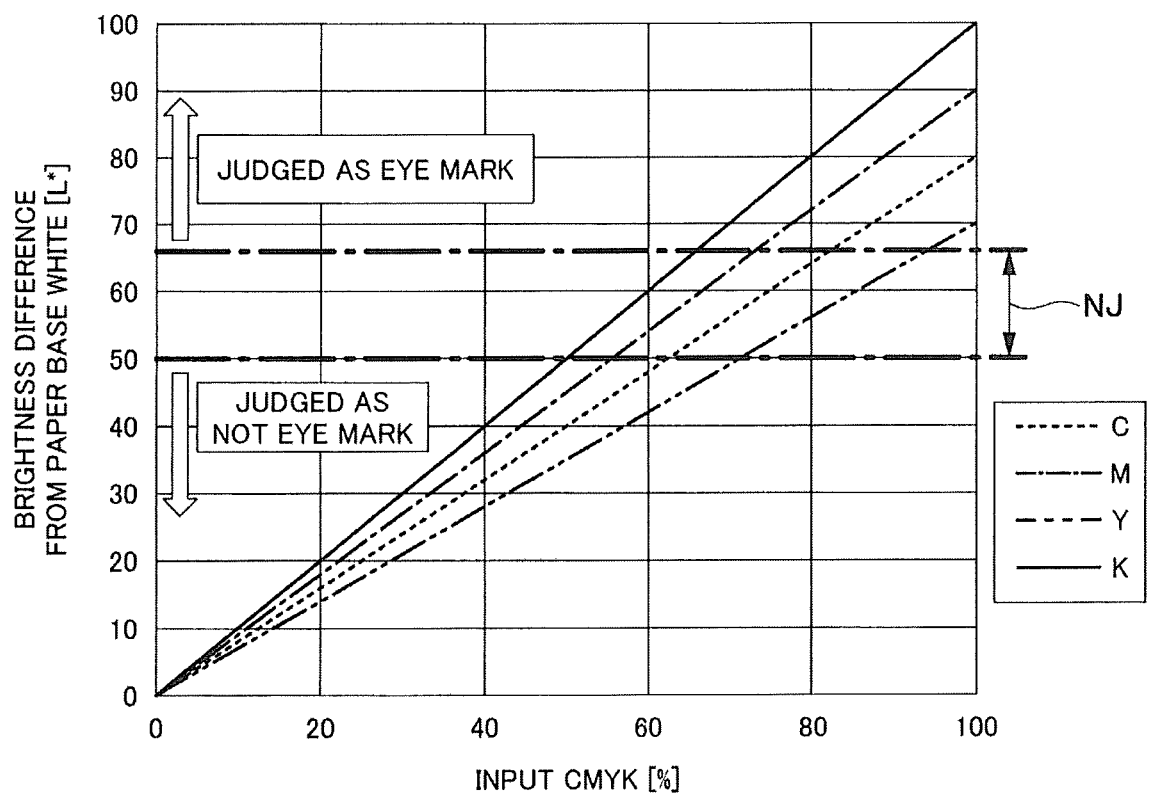
FIG. 14 is a graph which shows the relation between input CMYK value and brightness difference from the base color according to a third embodiment of the present invention.

FIG. 14 is a graph which shows the relation between input CMYK value and brightness difference from the base color of roll paper R according to the third embodiment. The horizontal axis represents input CMYK value (%) and the vertical axis represents brightness difference [L*] between input CMYK value and the base color.

As shown in the graph, if the eye mark detection criterion has a range due to the performance of the post-processing machine as indicated by the non-judgement range NJ, a color correction image cannot be printed with an input CMYK value within the non-judgement range NJ. In this case, color correction images must be printed according to the detection criterion as explained below. In the explanation below, a color correction image of cyan is taken as an example.

It is known from FIG. 14 that for cyan, the criterion to judge a color correction image as an eye mark is 82% or more.

Figure 15:
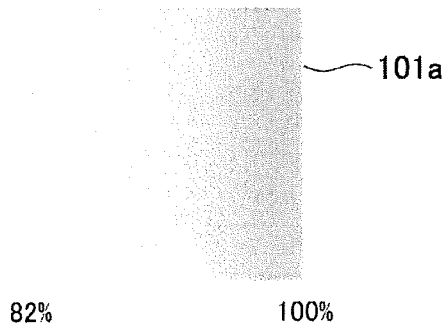
FIG. 15 shows an example of an eye mark (first color correction image) according to the third embodiment of the present invention.

FIG. 15 shows an example of an eye mark (first color correction image) according to the above detection criterion for cyan. As shown in the figure, a cyan first color correction image 101a with a tone range of 82%-100% is printed.

As shown in FIG. 14, for cyan, the criterion to judge a color correction image as not an eye mark is 62% or less.

Figure 16:
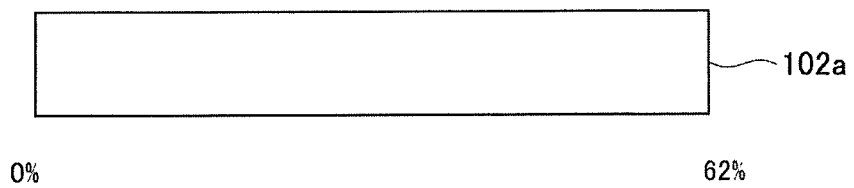
FIG. 16 shows an example of a color correction image (second color correction image) according to the third embodiment of the present invention.

FIG. 16 shows an example of a color correction image (second color correction image) according to the above cyan detection criterion. As shown in FIG. 16, a cyan second color correction image 102a with a tone range of 0%-62% is printed.

Next, the relation between cyan input value and brightness difference from the base color will be explained.

FIG. 17 is a graph which shows the relation between cyan input value and brightness difference from the base color. The horizontal axis represents cyan input value [%] and the vertical axis represents G value. The G value in the RGB color system most reflects the brightness information among the three color values and is highly corelated to L*. For simplicity, the explanation below focuses on the G value. Alternatively, L* may be used instead of the G value.

In the graph, the circle and solid line represent the range in which judgement as an eye mark is not made, and the black circle and chain line represent the range in which judgement as an eye mark is made. With the relation in FIG. 17, the G value is calculated in accordance with the following formula. The G values which correspond to cyan input values [%] of 62% to 82% are calculated in accordance with Formula (1) below:

$$y=-2.2x+250 \qquad (1)$$

If the cyan tone values of the color correction images used for tone correction by the control section 17 of the image forming device 10 are six values, namely 0%, 20%, 40%, 60%, 80%, and 100%, the following G values are used. The G value for 80% is calculated by interpolation between the G value for 60% and the G value for 100%.

0%=250
20%=206
40%=162
60%=118
80%=74 (calculated by interpolation)
100%=30

As explained above, in the third embodiment, the range in which it is impossible to judge whether an image is an image for the post-processing stage (eye mark) or not is eliminated from the detection criterion and color correction images (first color correction images and/or second color correction images) are arranged in outer areas in the printing data according to the detection criterion.

If some basic color tone for the image forming section 1 is not expressed by the first color correction image and/or second color correction image, the control section 17 calculates the unexpressed basic color tone from the information on the basic color tone expressed by the first color correction image and/or second color correction image, by interpolation.

Thus, according to the third embodiment, even if the detection criterion has a range in which it is impossible to judge whether an image is an image for the post-processing stage or not, the range is eliminated from the detection criterion and printing data including color correction images is generated. Color correction can be made according to the color correction images 4. Fourth Embodiment Although the density (color value or tone) of an eye mark is used for the judgment criterion at the post-processing stage, the information on the size of a color correction image may be also used. In the fourth embodiment, the size information is also acquired and used for the detection criterion to judge the image as an eye mark. For example, if the size of a color correction image is the detection criterion size (threshold) or larger, the image is judged as an eye mark and if it is smaller than the detection criterion size, the color correction image may be formed between eye marks.

Example 1 of the Fourth Embodiment

Figure 18:
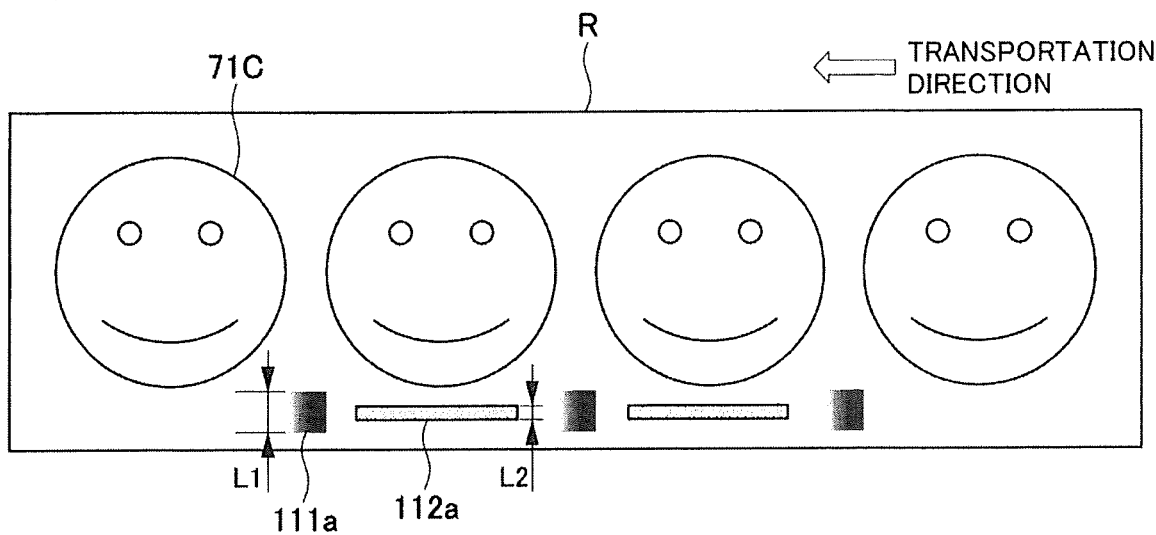
FIG. 18 is a print image which shows an example of arrangement of eye marks and color correction images according to Example 1 of a fourth embodiment of the present invention.

FIG. 18 is a print image which shows an example of arrangement of eye marks and color correction images according to Example 1 of the fourth embodiment.

In the figure, L1 represents the size of a first color correction image 111a simulating an eye mark in the direction perpendicular to the transportation direction and L2 represents the size of a second color correction image 112a in the same direction. Here, the size detection criterion is expressed by L and the size relation is assumed to be L2<L<L1.

In this case, since the first color correction image 111a satisfies the tone and size detection criteria, the post-processing machine (mark sensor) judges the first color correction image 111a as an eye mark. On the other hand, since size L2 does not satisfy the detection criterion L, the second color correction image 112a is not judged as an eye mark.

Example 2 of the Fourth Embodiment

Figure 19:
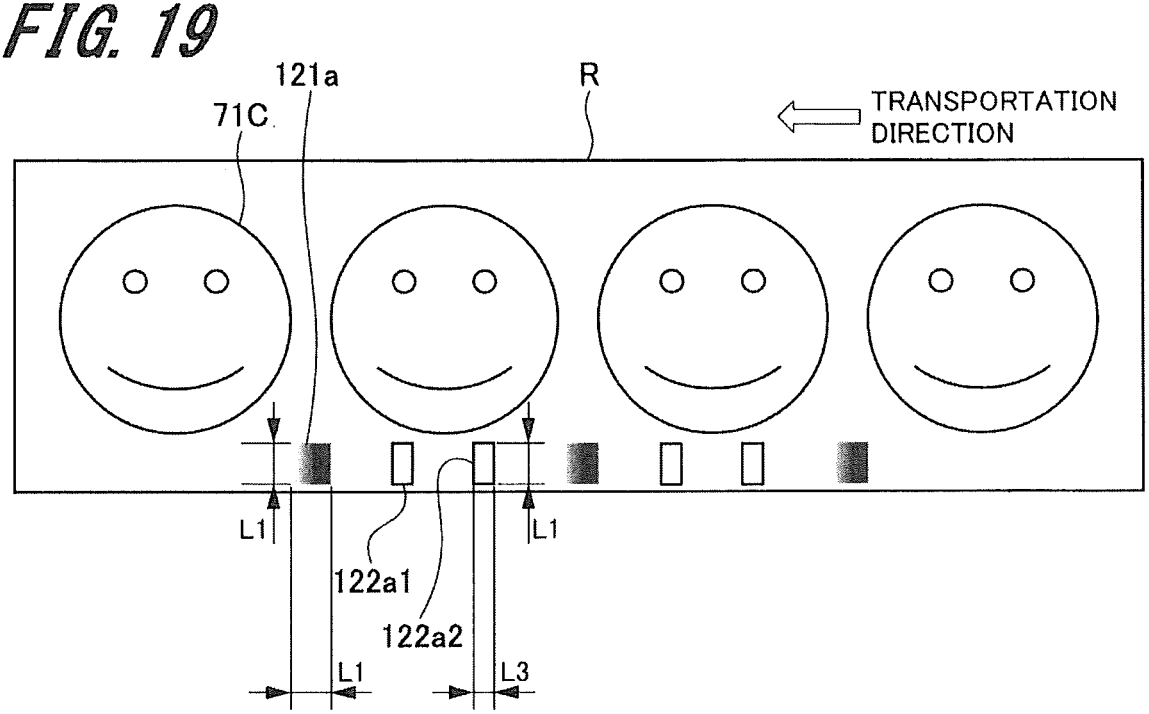
FIG. 19 is a print image which shows an example of arrangement of eye marks and color correction images according to Example 2 of the fourth embodiment of the present invention.

FIG. 19 is a print image which shows an example of arrangement of eye marks and color correction images according to Example 2 of the fourth embodiment.

In the figure, L1 represents the size of a first color correction image 121a simulating an eye mark in the direction perpendicular to the transportation direction and also the size in the transportation direction. L1 also represents the size of two second color correction images 122a1 and 122a2 in the direction perpendicular to the transportation direction and L3 represents their size in the transportation direction. Here, the size detection criterion is expressed by L and the size relation is assumed to be L3<L<L1.

In this case, since the first color correction image 121a satisfies the detection criteria concerning tone and size in the two directions, the post-processing machine (mark sensor) judges the first color correction image 121a as an eye mark. On the other hand, the size L3 of the two second color correction images 122a1 and 122a2 in the transportation direction does not satisfy the size detection criterion L, so these images are not judged as eye marks.

As shown in FIG. 19, a plurality of color correction images which are smaller in the transportation direction and not recognized as eye marks may be arranged in one eye mark printable area, namely between eye marks.

As explained above, in the fourth embodiment, if the size of a post-processing image in printing data is a threshold or larger, the control section 53 arranges a first color correction image as a post-processing image, and if the size of the post-processing image is smaller than the threshold, the control section 53 arranges a second color correction image as a post-processing image. Therefore, the fourth embodiment offers not only the advantageous effects of the first to third embodiments but also a further advantageous effect that a color correction image whose density is sufficient for recognition as an eye mark in the first to third embodiments can be arranged in an area other than an eye mark place, namely in the blank space of an eye mark printable area.

5. Variations

Although color correction images are formed in the eye mark place and blank space which is an area other than the eye mark place, in an eye mark printable area in the first to fourth embodiments, instead only a color correction image (first color correction image) simulating an eye mark may be formed in an eye mark place. Conversely, only a color correction image as a non-eye mark (second color correction image) may be formed between eye marks (in the blank space of an eye mark printable area). In the present invention, a color correction image simulating an eye mark or a color correction image as a non-eye mark can be formed according to a detection criterion as appropriate and arranged in an eye mark printable area.

Although the eye mark and color correction chart are assumed to be rectangular in the first to fourth embodiments, these may be cruciform, triangular, or circular. Thus, the eye mark (first color correction image) and color correction chart (second color correction image) can be specified as appropriate regardless of not only size but also shape and the advantageous effects of the above embodiments can be achieved.

The present invention is not limited to the above embodiments. Obviously, the present invention may be embodied and applied in other various ways without departing from the gist of the invention as described in the appended claims.

For example, in the above embodiments, the configurations of the image forming device and image forming system have been described in detail and concretely for easy understanding of the present invention; however, the present invention is not limited to a configuration which includes all the elements described above. An element of an embodiment may be replaced by an element of another embodiment. An element of an embodiment may be added to another embodiment. For each embodiment, addition, deletion, or replacement of an element can be made.

The above configurations, functions, processors and so on may be, in part or in whole, implemented by hardware such as an integrated circuit.

Although embodiments of the present invention have been described and illustrated in detail, the disclosed embodiments are made for purposes of illustration and example only and not limitation. The scope of the present invention should be interpreted by terms of the appended claims

REFERENCE SIGNS LIST

10 . . . image forming device,
16 . . . image forming section,
17 . . . control section,
50 . . . controller,
53 . . . control section,
54 . . . RIP section,
55 . . . storage,
71 . . . original image formation area,
71C . . . label image (content image),
72, 73 . . . outer area,
74-1 to 74-3 . . . eye mark printable area,
75a to 75c . . . eye mark places (post-processing image places)
81a to 81c . . . first color correction image (outer area image (post-processing images)),
82a, 82b . . . second color correction image (outer area image),
531 . . . detection criterion acquiring section,
532 . . . setting information acquiring section,
533 . . . color correction image creating section,
534 . . . color correction image arrangement section,
R . . . roll paper

What is claimed is:

1. An image forming device comprising:
   a printing data generator which generates printing data by adding outer area image data to form an outer area image in an outer area extending in a transportation direction of a continuous recording medium, other than an area for formation of an original image, to original image data; and
   an image forming section which forms the original image on the continuous recording medium according to the original image data included in the printing data generated by the printing data generator and forms the outer area image on the continuous recording medium according to the outer area image data included in the printing data generated by the printing data generator, wherein
   the printing data generator creates a color correction image, to be used for color correction of the original image to be formed by the image forming section, according to a detection criterion to detect a post-processing image for use at a post-processing stage, such that the created color correction image does not satisfy the detection criterion and is not thereby recognized as a post-processing image, which satisfies the detection criterion, for use at a post-processing stage; and
   the printing data generator arranges the created color correction image in the outer area of the continuous recording medium as the outer area image.

2. The image forming device according to claim 1, wherein the detection criterion is a brightness difference between a base color of the continuous recording medium and the post-processing image for use at a post-processing stage, satisfying the detection criterion, and the printing data generator calculates a color value of a basic color for the image forming section according to the detection criterion.

3. The image forming device according to claim 2, wherein the printing data generator creates the color correction image satisfying the detection criterion in accordance with a tone of the calculated color value of the basic color for the image forming section, and arranges the created color correction image in the outer area of the continuous recording medium.

4. The image forming device according to claim 3, wherein the printing data generator arranges the post-processing image satisfying the detection criterion, at a post-processing image place in the outer area of the continuous recording medium.

5. The image forming device according to claim 3, wherein the printing data generator forms the color correction image not satisfying the detection criterion, at a position other than a post-processing image place in the outer area of the continuous recording medium.

6. The image forming device according to claim 4, wherein the printing data generator forms the color correction image not satisfying the detection criterion, at a position other than the post-processing image place in the outer area.

7. The image forming device according to claim 6, wherein
the detection criterion includes a threshold of a size of the post-processing image satisfying the detection criterion,
if the size of the post-processing image satisfying the detection criterion is the threshold or larger, the printing data generator arranges the post-processing image satisfying the detection criterion at the post-processing image place in the outer area, and if the size of the color correction image not satisfying the detection criterion is smaller than the threshold, the printing data generator arranges the color correction image not satisfying the detection criterion, at the position other than the post-processing image position in the outer area.

8. The image forming device according to claim 6, wherein the printing data generator creates the post-processing image satisfying the detection criterion and/or the color correction image not satisfying the detection criterion, according to a content of the original image.

9. The image forming device according to claim 8, wherein the printing data generator creates the post-processing image satisfying the detection criterion and/or the color correction image not satisfying the detection criterion, using the basic color used in the original image.

10. The image forming device according to claim 6, wherein the post-processing image satisfying the detection criterion or the color correction image not satisfying the detection criterion has a plurality of colors.

11. The image forming device according to claim 6, wherein
the outer area lies near an edge of the continuous recording medium in a direction perpendicular to the transportation direction, and
the post-processing image satisfying the detection criterion and the color correction image not satisfying the detection criterion are arranged in the outer area along the transportation direction of the continuous recording medium.

12. The image forming device according to claim 6, further comprising:
an image reader capable of reading information on a surface of the continuous recording medium.

13. The image forming device according to claim 6, wherein if the detection criterion has a range in which whether an image is the post-processing image satisfying the detection criterion or not cannot be judged, the printing data generator eliminates the range in which whether the image is the post-processing image satisfying the detection criterion or not cannot be judged, from the detection criterion and then arranges the post-processing image satisfying the criterion and/or the color correction image not satisfying the detection criterion, in the outer area of the continuous recording medium, according to the detection criterion.

14. An image forming method for an image forming device comprising:
a printing data generator which generates printing data by adding outer area image data to form an outer area image in an outer area extending in a continuous recording medium transportation direction of a continuous recording medium, other than an area for formation of an original image, to original image data; and
an image forming section which forms the original image on the continuous recording medium according to the original image data included in the printing data generated by the printing data generator and forms the outer area image on the continuous recording medium according to the outer area image data,
the method using a non-transitory computer-readable recording medium storing a program causing a computer to enable the printing data generator to perform:
acquiring a detection criterion to detect a post-processing image for use at a post-processing stage;
creating a color correction image to be used for color correction of the original image to be formed by the image forming section, according to the detection criterion, such that the created color correction image does not satisfy the detection criterion and is not thereby recognized as a post-processing image for use at a post-processing stage, satisfying the detection criterion; and
arranging the created color correction image in the outer area in the printing data of the continuous recording medium, as the outer area image.

15. A non-transitory computer-readable recording medium storing a program causing a computer, which generates printing data by adding outer area image data to form an outer area image in an outer area extending in a transportation direction of a continuous recording medium, other than an area for formation of an original image, to original image data, to perform:
acquiring a detection criterion to detect a post-processing image for use at a post-processing stage;
creating a color correction image to be used for color correction of the original image, according to the detection criterion, such that the created color correction image does not satisfy the detection criterion and is not thereby recognized as a post-processing image for use at a post-processing stage, satisfying the detection criterion; and
arranging the created color correction image in the outer area of the continuous recording medium, as the outer area image.

* * * * *